United States Patent
Sauriol et al.

(10) Patent No.: US 7,206,825 B1
(45) Date of Patent: Apr. 17, 2007

(54) SYSTEM AND METHOD FOR NETWORK CONFIGURATION ENGINE

(75) Inventors: Nicolas Sauriol, Nepean (CA); Alex Sauriol, Nepean (CA)

(73) Assignee: Nortel Networks Limited, Quebec (CA)

( * ) Notice: Subject to any disclaimer, the term of this patent is extended or adjusted under 35 U.S.C. 154(b) by 1076 days.

(21) Appl. No.: 10/029,855

(22) Filed: Dec. 31, 2001

(51) Int. Cl.
*G06F 15/177* (2006.01)
(52) U.S. Cl. .................................... 709/220; 709/223
(58) Field of Classification Search ................ 709/220, 709/223
See application file for complete search history.

(56) References Cited

U.S. PATENT DOCUMENTS

| | | | | |
|---|---|---|---|---|
| 6,137,782 A | * | 10/2000 | Sharon et al. | 370/255 |
| 6,259,679 B1 | * | 7/2001 | Henderson et al. | 370/254 |
| 6,549,943 B1 | * | 4/2003 | Spring | 709/223 |
| 6,691,161 B1 | * | 2/2004 | Cook et al. | 709/223 |
| 6,704,284 B1 | * | 3/2004 | Stevenson et al. | 370/241 |
| 6,788,315 B1 | * | 9/2004 | Kekic et al. | 709/203 |

* cited by examiner

*Primary Examiner*—Rupal Dharia
*Assistant Examiner*—Nicholas R Taylor
(74) *Attorney, Agent, or Firm*—Hunton & Williams LLP

(57) ABSTRACT

A system for a universal network configuration engine includes a client machine which interfaces to an extensible library of data about network elements, such as routers, switches, hubs and other devices. The elements may be made by diverse manufacturers and use different protocols. However, a unified user interface on the client permits a network administrator to access, update, configure and otherwise manipulate the network elements of a new or existing network, using a single tool which abstracts the hardware and software interfaces, for instance using object oriented code. The client may have a port to the physical or virtual network being configured, for hot testing or other purposes.

24 Claims, 4 Drawing Sheets

SYSTEM AND METHOD FOR NETWORK CONFIGURATION ENGINE

FIELD OF THE INVENTION

The invention relates to the field of communications, and more particularly to an extensible network configuration engine for the selection and deployment of network elements using a universal tool.

BACKGROUND OF THE INVENTION

The communication industry, including telephonic, IP-based digital and other networks, has seen the type and number of network elements multiply in recent years. Unfortunately, manufacturers of network equipment such as routers, switches, database elements and others have not made it a priority to create flexible configuration tools.

Thus, a manufacturer of data, telephone or hybrid telephone/data switches might provide an independent software package to select and configure networks composed of its own products. However, networks built from components made by diverse manufacturers have had no universal tool for the selection, testing and integration of overall network architectures. The costs of network acquisition and maintenance, as well as personnel training, are therefore increased. Other problems exist.

SUMMARY OF THE INVENTION

The invention overcoming these and other problems in the art relates in one regard to a system and method for a network configuration engine, the configuration engine having an extensible library of network elements to selectively add, drop or change the network devices and services being prepared and deployed. In one embodiment, the network configuration engine of the invention may be implemented as a portable software package, for instance a Java module, which serves to abstract the hardware and software specifications and interfaces from one or many manufacturers while permitting simulation and configuration of assembled networks to take place. Both physical network elements as well as user interfaces, such as network mappers and other software tools, may be configured according to the invention.

BRIEF DESCRIPTION OF THE DRAWINGS

The invention will be described with reference to the accompanying drawings, in which like elements are referenced with like numerals.

DETAILED DESCRIPTION OF PREFERRED EMBODIMENTS

Figure 1:
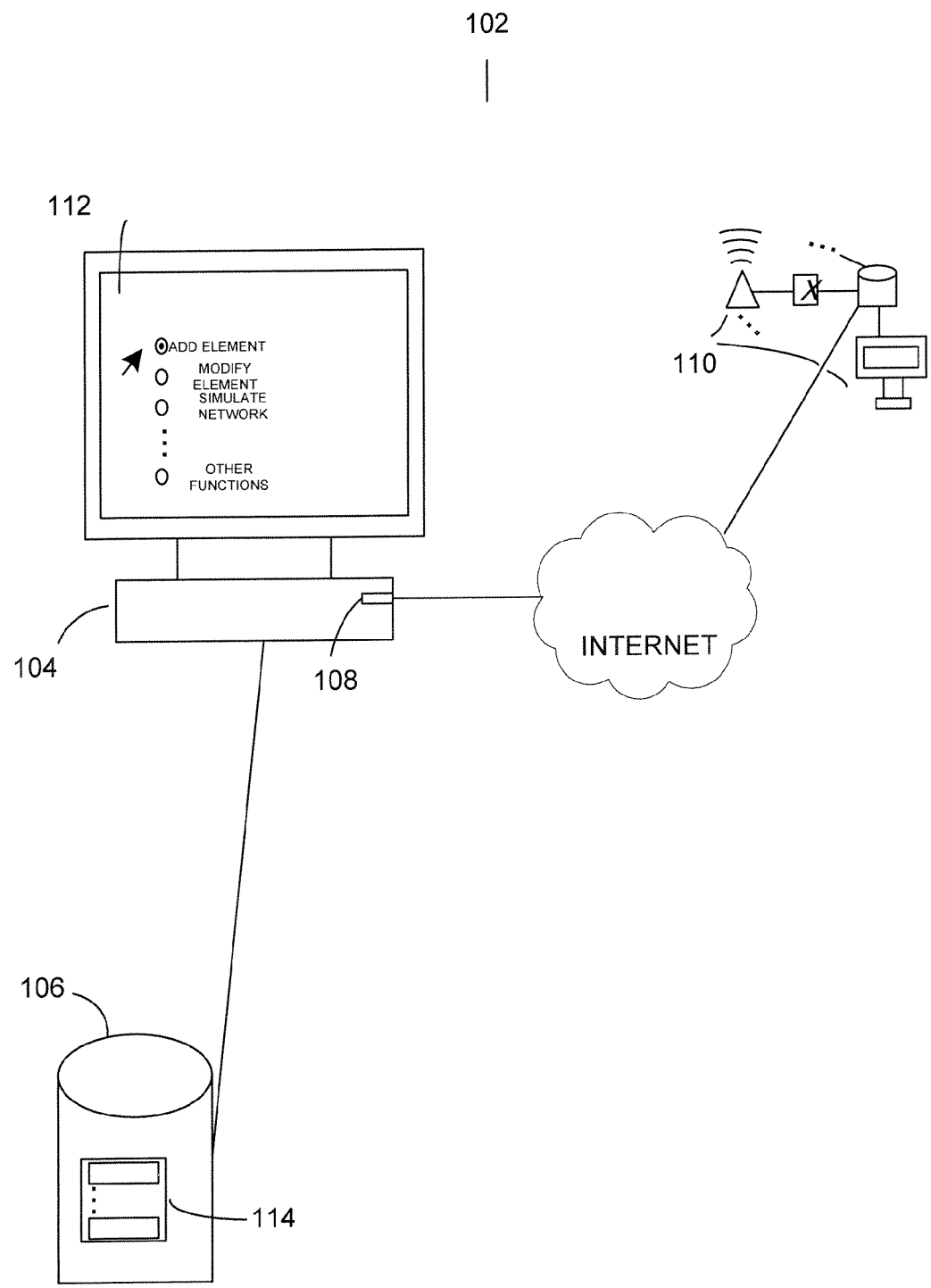
FIG. 1 illustrates a network configuration engine according to an embodiment of the invention.

An overall architecture for a network configuration engine 102 according to the invention is illustrated in FIG. 1. According to this embodiment, the network configuration engine 102 may include a client 104 communicating with a network element database 106 and a network port 108. The client 104 may access the network element database 106 to determine the specifications, interfaces, versions, update status and other attributes of one or more network element 110 which may be used to build network hardware, features or services using one extensible tool.

In one embodiment, the client 104 may be, include or interface to, for instance, a personal computer running the Microsoft Windows™ 95, 98, Millenium™, NT™, 2000 or XP™, Windows™CE™, MacOS™, PalmOS™, Unix, Linux, Solaris™, OS/2™, BeOS™, MacOS™, VAX VMS or other operating system or platform. Client 104 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

The client 104 may be equipped with an integral or connectable cathode ray tube (CRT), liquid crystal display (LCD), electroluminescent display, light emitting diode (LED) or other display screen, panel or device for viewing and manipulating files, data and other resources, for instance using a user interface 112, such as a graphical user interface (GUI) or command line interface (CLI). Client 104 may also be, include or interface to a network-enabled appliance such as a portable networkable notebook or similar computer, a wireless cellular or other wireless device, an intelligent instrumentation platform or other host system.

Figure 2:
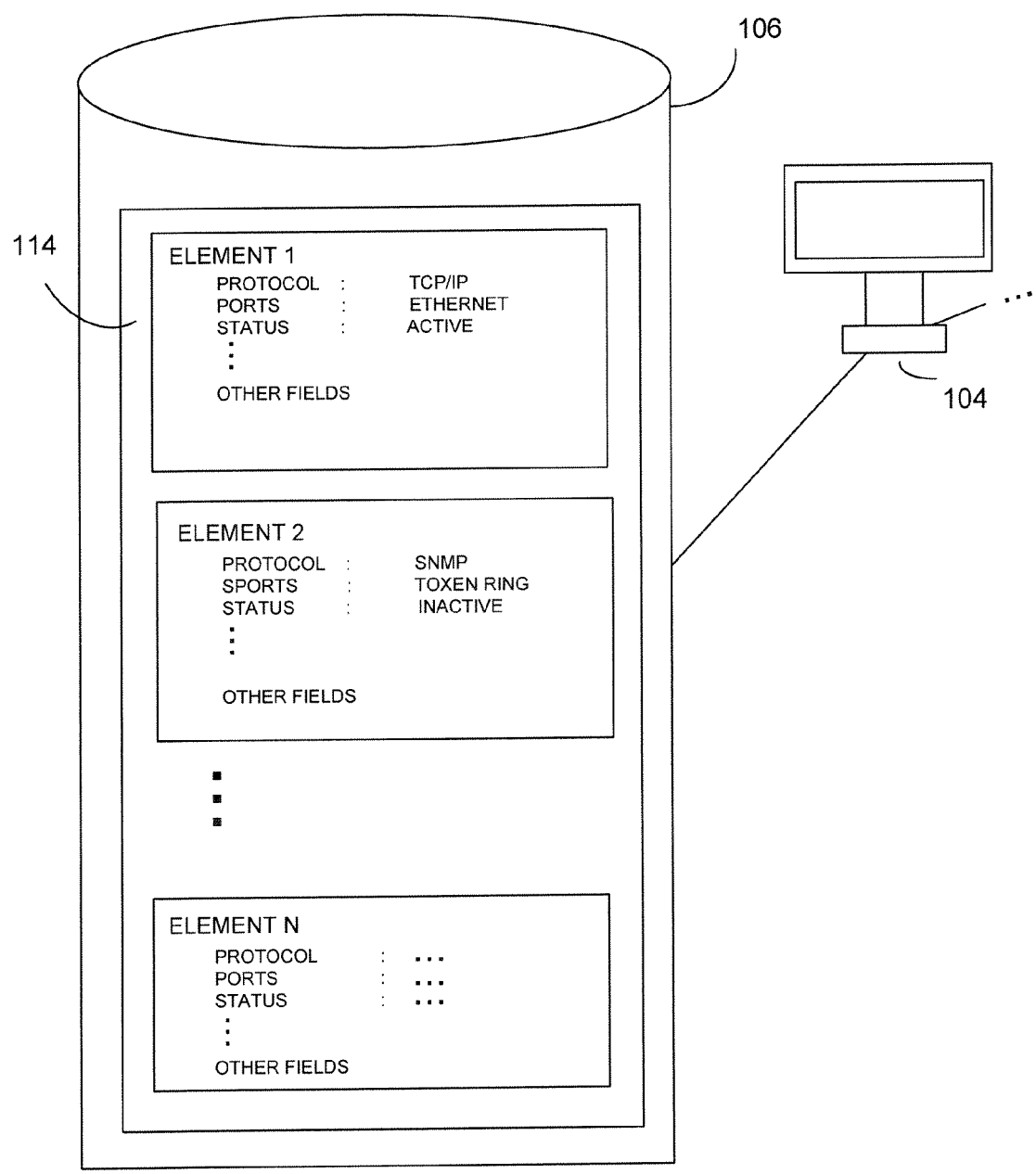
FIG. 2 illustrates a network element library for use in a network configuration engine according to an embodiment of the invention.

The client 104 may communicate with the network element database 106 to assess, configure, test, modify and otherwise manipulate the setup and design of one or more networks, for instance telephone, Internet Protocol, Local Area Networks (LANs) or other network or network elements using one or more network element 110. As illustrated in FIG. 2, the network element database 106 may include a network element library 114 which contains sets of data on one or more network element 110.

Each of the one or more of network element 110 may be, include, or interface to, for instance, a data router, a data switch, a data hub, a telephone platform such as a central office switch or a mobile switch, a gateway platform, a modem bank, a T1 or T3 line, an optical switch or multiplexer such as a wavelength division multiplexer (WDM) or other optical component, a database or database cluster, a redundant database such as a RAID installation, or other wired or wireless, optical, mechanical or electrical component.

The network element database 106 housing the network element library 114 may be, include or interface to may be, include or interface to, for example, the Oracle™ relational database sold commercially by Oracle Corp. Other databases, such as Informix™, DB2 (Database 2), Sybase™ or other data storage or query formats, platforms or resources such as OLAP (On Line Analytical Processing), SQL (Standard Query Language), a storage area network (SAN), Microsoft Access™ or others may also be used, incorporated or accessed in the network element database 106 of the invention.

The network element database 106 may adhere to hierarchical, relational, flat or other models. The network element database 106 may be supported by server or other resources, and may in embodiments include redundancy, such as a redundant array of independent disks (RAID), for data protection.

The network element database 106 and network element library 114 may store information regarding an extensible set of network protocols and types for installable components, for instance including the dynamic host configuration protocol (DHCP), routing information protocol (RIP), the transmission control protocol (TCP), the Internet protocol (IP), the domain name service (DNS), the simple network management protocol (SNMP), the media gateway control protocol (MGCP, or H.248), the gateway location protocol (GLP), the simple Internet protocol plus (SIPP), resource allocation protocol (RAP), the service location protocol (SLP), the lighteight directory access protocol (LDAP), and other protocols, data formats and other configuration types which may be employed in the design, programming, testing and maintenance of networks.

Because the hardware and software interfaces and other requirements for the one or more network element 110 are abstracted in the network element library 110, by using the network configuration platform 102 of the invention a network administrator may configure and assess a variety of network implementations without having to stop and execute a different proprietary tool for each component.

In embodiments, the network administrator or other user may communicate with a physical or virtual network being configured using the network port 108, for hot testing and other purposes. In other embodiments, the client 104 may image the subject network so that network configurations may be loaded to tape, disk or otherwise stored for later delivery, testing, validation or modification.

Figure 3:
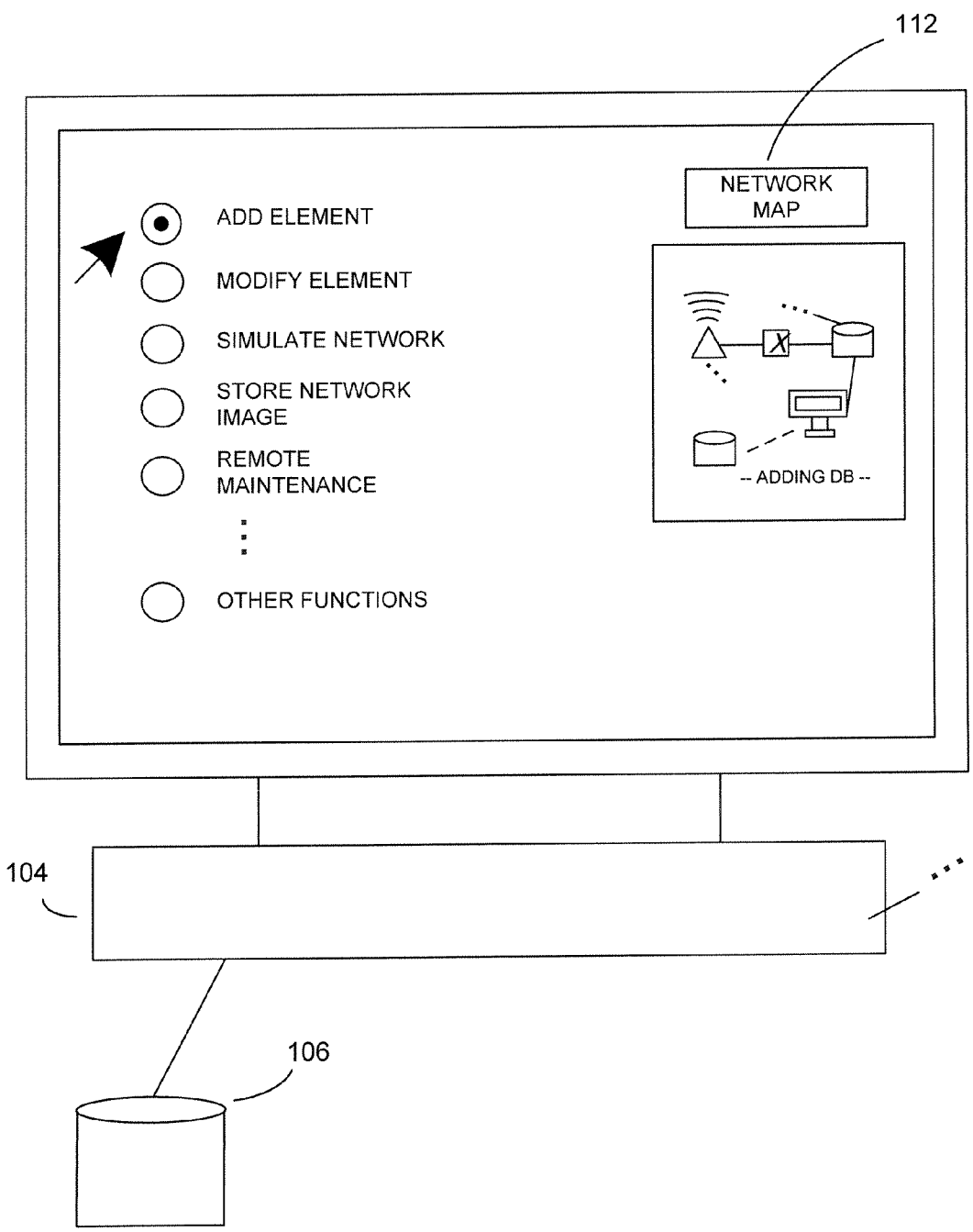
FIG. 3 illustrates a user interface for manipulating testing and other functions of the network configuration engine according to an embodiment of the invention.

As illustrated in FIG. 3, using the user interface 112 of client 104, a network administrator or other user may configure, initiate, program, modify, test and otherwise manipulate a physical or virtual representation of a subject network. The user interface 112 may present a user with a text or graphical representation of the elements of a network and their associated characteristics. In an embodiment as illustrated, the user interface may present the user with a network map showing network elements, their connection topology and other characteristics. In embodiments, the configured network may be simulated to examine fault conditions, throughput or other network conditions. In other embodiments, if the client 104 may communicate via network port 108 with physical implementations, testing of the hardware components may be performed. In embodiments, the user interface 112 may permit the user to capture an image of a subject network for further modification or testing, for instance by storing the network nodes, protocols, interface specifications and other data to electronic or disk memory.

In embodiments, the user interface 112 may be programmed with or include or interface to network enabled code. The network enabled code may be, include or interface to, for example, Internet Protocol (IP) or Internet Protocol Next Generation (IPng) code or data, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™ Java Beans, Enterprise Java Beans, Jini™, C, C++, Perl, UNIX Shell, Visual Basic or Visual Basic Script, Virtual Reality Markup Language (VRML), ColdFusion™, Common Gateway Interface (CGI), the Simple Internet Protocol Plus (SIPP), servelets, peer-to-peer networking code or other compilers, assemblers, interpreters or other computer languages or platforms.

Figure 4:
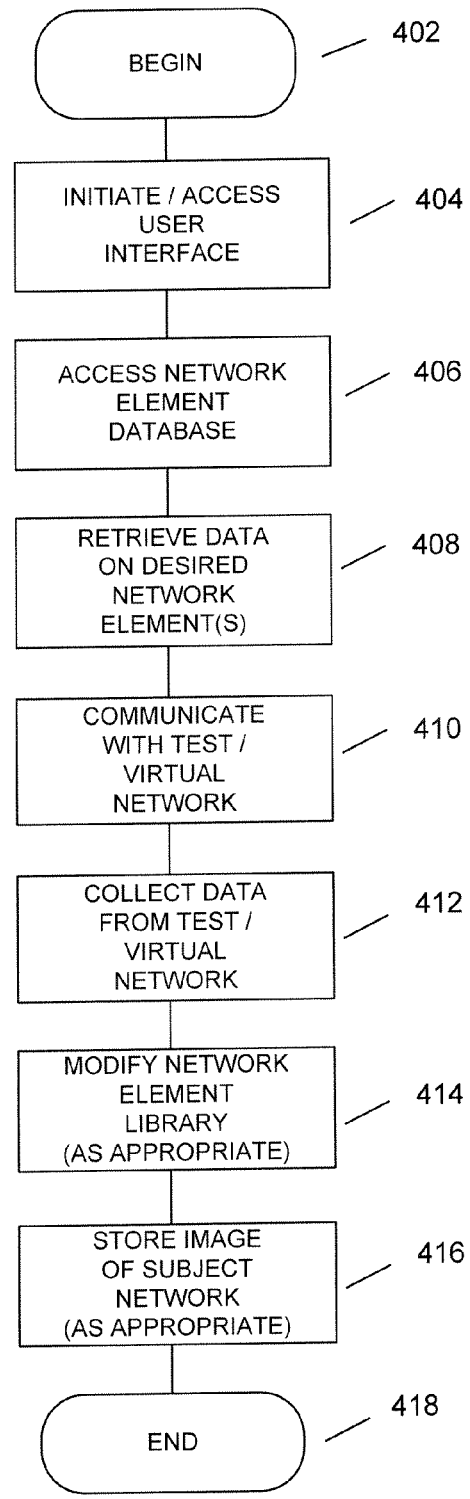
FIG. 4 illustrates a flowchart of configuration processing according to an embodiment of the invention.

Overall configuration processing according to the invention is illustrated in FIG. 4. In step 402, processing begins. In step 404, a user may access the user interface 112 of the client 104 to set up, configure, test, maintain, program or otherwise manipulate one or more networks, such as a wired, wireless or optical telephone or data network.

In step 406, the user interface 112 may be used to access and manipulate the network element database 106. In step 408, data regarding one or more network element 110 may be accessed to configure the subject network, such as by inserting one or more network element 110 into a test or operating network. In step 410, the client 104 may communicate with a test, virtual or operating network via network port 108, for testing or other purposes if desired.

In step 412, the client 104 may collect data from a test, virtual or operating network as appropriate, for instance for maintenance, upgrade or other purposes. In step 414, the network element library 114 may be modified, for instance to add, delete, update or otherwise modify a list of the one or more network element 110 or otherwise. In step 416, an image of the subject network, including configuration, operating condition, active or inactive status and other states may be stored as appropriate. In step 418, processing ends.

The foregoing description of the system and method of the invention is illustrative, and variations in configuration and implementation will occur to persons skilled in the art. For instance, while the invention has been generally described with respect to a configuration where a single client 104 operates to control the configuration of a network, two or more client devices may cooperate to control the setting of the subject network. Likewise, while the invention has generally been described in terms of configuring a single network, in embodiments multiple networks, including networks of networks, may be configured and manipulated according to the invention.

The scope of the invention is accordingly intended to be limited only by the following claims.

What is claimed is:

1. A system for configuring networks, comprising:
at least one network element database, the at least one network element database storing abstracted interface data regarding at least one network element; and
a processor, communicating with the at least one network element database, the processor operable to: (1) abstract the interface data regarding the at least one network element, and (2) configure a network using the abstracted interface data stored in the at least one network element database.

2. The system of claim 1, wherein the at least one network element database comprises a set of data corresponding to network elements.

3. The system of claim 2, wherein the set of data corresponding to network elements comprises data corresponding to at least one of routing elements, switching elements, optical elements, and wireless elements.

4. The system of claim 3, wherein the set of data corresponding to network elements is extensible.

5. The system of claim 1, wherein the processor comprises a user interface.

6. The system of claim 5, wherein the user interface comprises object oriented code.

7. The system of claim 6, wherein the user interface comprises at least one of a network element list and a network map.

8. The system of claim 1, further comprising a network port, the processor communicating via the network port with a network to be configured.

9. The system of claim 1, wherein the interface data comprises at least one of software interface requirements, hardware interface requirements, and protocol specifications.

10. The system of claim 1, wherein the processor stores an image of a network for modification.

11. A method for configuring networks using a processor, comprising:
   a) abstracting interface data regarding at least one network element;
   b) storing the abstracted interface data regarding the at least one network element in at least one network element database; and
   c) configuring a network via communication with the abstracted interface data stored in the at least one network element database.

12. The method of claim 11, wherein the at least one network element database comprises a set of data corresponding to network elements.

13. The method of claim 12, wherein the set of data corresponding to network elements comprises data corresponding to at least one of routing elements, switching elements, optical elements, and wireless elements.

14. The method of claim 13, wherein the set of data corresponding to network elements is extensible.

15. The method of claim 11, wherein the processor comprises a user interface.

16. The method of claim 15, wherein the user interface comprises object oriented code.

17. The method of claim 16, wherein the user interface comprises at least one of a network element list and a network map.

18. The method of claim 11, further comprising a step of c) communicating via a network port with a network to be configured.

19. The method of claim 11, wherein the interface data comprises at least one of software interface requirements, hardware interface requirements, and protocol specifications.

20. The method of claim 11, further comprising a step of d) storing an image of a network for modification.

21. The system of claim 1 wherein the processor is further operable to simulate the network.

22. The method of claim 11 network wherein the processor is further operable to simulate the network.

23. The system of claim 1 wherein network configuration occurs without having to execute a different proprietary tool for each of the at least one network element.

24. The method of claim 11 wherein network configuration occurs without having to execute a different proprietary tool for each of the at least one network element.

* * * * *